(12) United States Patent
Genick, II

(10) Patent No.: US 7,370,868 B2
(45) Date of Patent: May 13, 2008

(54) CAM BOLT ASSEMBLY

(75) Inventor: Raymond M Genick, II, Waterford, MI (US)

(73) Assignee: Newfrey LLC, Newark, DE (US)

( * ) Notice: Subject to any disclaimer, the term of this patent is extended or adjusted under 35 U.S.C. 154(b) by 331 days.

(21) Appl. No.: 10/698,134

(22) Filed: Oct. 31, 2003

(65) Prior Publication Data

US 2004/0090030 A1    May 13, 2004

Related U.S. Application Data

(60) Provisional application No. 60/423,117, filed on Nov. 1, 2002.

(51) Int. Cl.
*B62D 17/00* (2006.01)
(52) U.S. Cl. .................................. 280/86.753
(58) Field of Classification Search ................................
280/86.75–86.754, 86.757, 8; 411/396, 411/398, 531, 539, 368
See application file for complete search history.

(56) References Cited

U.S. PATENT DOCUMENTS

| | | | |
|---|---|---|---|
| 696,582 A | 4/1902 | Myers | 411/397 |
| 2,525,217 A | 10/1950 | Glitsch | 261/114.5 |
| 3,880,444 A * | 4/1975 | Bridges | 280/86.753 |
| 4,418,938 A | 12/1983 | Sullivan et al. | 280/86.754 |
| 4,424,984 A * | 1/1984 | Shiratori et al. | 280/86.753 |
| 4,650,208 A * | 3/1987 | Mason | 280/86.757 |
| 4,695,073 A * | 9/1987 | Pettibone et al. | 280/86.757 |
| 4,790,703 A | 12/1988 | Wing | 411/282 |
| 4,869,527 A * | 9/1989 | Coddens | 280/86.753 |
| 5,482,417 A | 1/1996 | Erickson | 29/456 |
| 5,580,201 A | 12/1996 | Brilmyer | 411/169 |
| 5,775,719 A | 7/1998 | Holden | |
| 5,779,260 A | 7/1998 | Reilly et al. | 403/4 |
| 6,113,299 A * | 9/2000 | Reichelt et al. | 403/13 |
| 6,409,189 B1 * | 6/2002 | Orimoto et al. | 280/86.751 |
| 6,669,421 B2 | 12/2003 | Hofschneider | 411/368 |
| 6,851,687 B2 * | 2/2005 | Klais | 280/86.754 |
| 7,083,176 B2 * | 8/2006 | Soles et al. | 280/86.755 |
| 7,101,132 B2 * | 9/2006 | Hofschneider | 411/368 |
| 7,125,026 B2 * | 10/2006 | Genick, II | 280/86.753 |
| 2005/0062248 A1 * | 3/2005 | Winkler et al. | 280/86.758 |

* cited by examiner

*Primary Examiner*—Ruth Ilan
*Assistant Examiner*—Leonard McCreary, Jr.
(74) *Attorney, Agent, or Firm*—Harness, Dickey & Pierce, P.L.C.

(57) ABSTRACT

A cam bolt assembly for use in a vehicle's suspension system. The cam bolt assembly is used to adjust the vehicle's wheel alignment. The assembly has a threaded fastener defining a pair of longitudinal channels, a first cam plate is coupled to the threaded bolt, a second cam plate defining an aperture is mated to the pair of longitudinal channels. At least one of the cam plates has an arcuate slot configured to mate with a component of the suspension system.

21 Claims, 2 Drawing Sheets

CAM BOLT ASSEMBLY

CROSS-REFERENCE TO RELATED APPLICATIONS

This application claims the benefit of U.S. Provisional Application No. 60/423,117, filed on Nov. 1, 2002. The disclosure of the above application is incorporated herein by reference.

FIELD OF THE INVENTION

The present invention relates to a cam bolt for a vehicle suspension and, more particularly, to a cam bolt having a locking feature which efficiently couples a cam plate to a bolt without significantly reducing the bolt's effective strength.

BACKGROUND OF THE INVENTION

It has been known that plates can be coupled to shafts utilizing a single notch cut into the bolt surface. Traditionally, the plate has a D-shaped hole with a cross-section which corresponds to the cross-section of the notch disposed in the bolt is placed over the bolt and held using a threaded fastener.

Often, the plates are subject to torsional loading, which imparts torsional loading to the bolt. Often, designs require that these bolts have a particular torsional strength to ensure that the flange does not become dislodged from the bolt when loaded. In order to maintain the relative position of the plate with respect to the bolt during the torsional loading, the interaction of the plate with the bolt must be such that plastic deformation of the interface does not occur. For this condition to occur, large portions of the bolt surface have been removed to allow for proper interlocking of the members.

The notched bolt, because of its reduced cross-sectional area, has significantly reduced strength. As such, to maintain load requirements, the diameter of the bolt is typically significantly increased to compensate for the weakness in the threaded portion of the fastener. This increases cost and weight of the assembly.

SUMMARY OF THE INVENTION

A cam bolt assembly for using in a vehicle's suspension system to adjust the vehicle's wheel alignment is disclosed having a threaded fastener defining a pair of longitudinal channels, a first cam plate is coupled to the threaded bolt, a second cam plate defining an aperture is mated to the pair of longitudinal channels. At least one of the cam plates has an arcuate slot configured to mate with a component of the suspension system.

In another embodiment of the invention, both the first and second cam plates have an arcuate slot. The longitudinal channels of the threaded fastener has a t-shaped cross section.

In another embodiment of the invention, the threaded fastener has a knurl portion configured to mate with the first cam bolt. Further, the channel of the cam bolt assembly defines a pair of exterior bearing surfaces which mate with a corresponding interior bearing surface within the aperture.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses.

Figure 1:
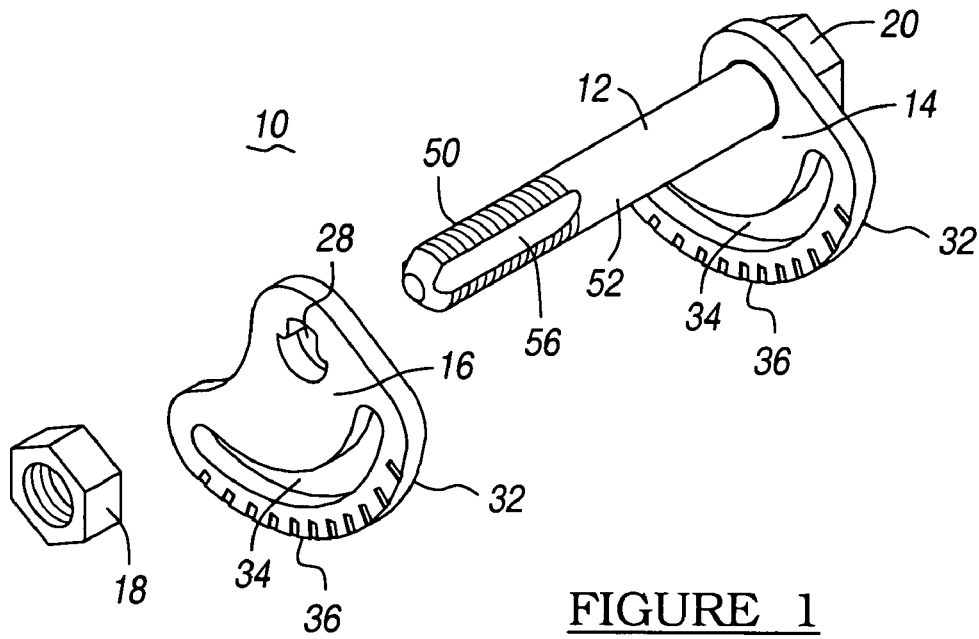
FIG. 1 represents a perspective exploded view of a cam bolt according to one embodiment of the invention.
Figure 2:
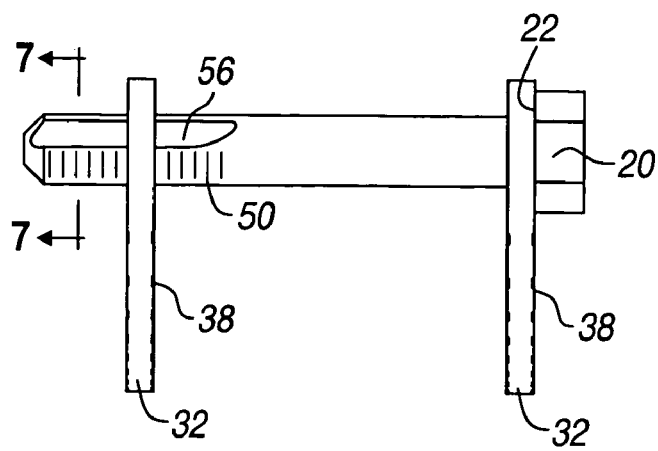
FIG. 2 represents a side view of the fastener according to the teachings of the present invention.

FIGS. 1 and 2 represent a perspective exploded view and a side view of a cam bolt assembly 10 according to the teachings of the present invention. The cam bolt assembly 10, which is formed of a threaded bolt 12, first cam plate 14, second cam plate 16, and a nut 18, is used in a vehicle's suspension system to adjust the vehicle's wheel alignment. When assembled, the cam bolt assembly is configured to have a rotational tolerance of ±3 degrees.

The threaded bolt 12 has a bolt head 20 having a bolt head inner surface 22 which supports the first cam plate 14. The first cam plate 14 defines a circular aperture 24, which has a radius substantially equal to the diameter of the threaded bolt 12. The first cam plate 14 is rotationally coupled to the threaded bolt 12 by a knurl 26 formed on the threaded bolt 12 adjacent the bolt head 20. In this regard, the circular aperture 24 is configured to have a diameter such that the coupling of the circular aperture with the knurl 26 rotationally and longitudinally fixes the first cam plate 14 to the bolt 12.

As best seen in FIG. 2, the second cam plate 16 has an aperture 28 which is configured to mate with the cross section 30 of the threaded portion of the threaded bolt 12. The second cam plate 16 is disposed about the threaded bolt 12 so that the first and second cam plates 14 and 16 are generally parallel.

Figure 3:
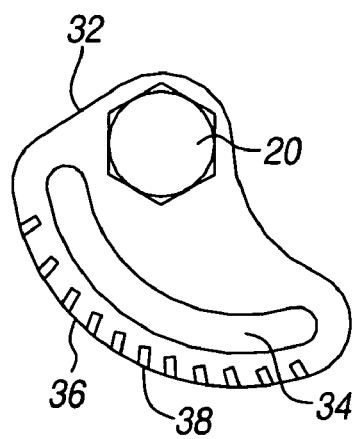
FIG. 3 is an end view of the fastener according to the teachings of the present invention.

FIG. 3 is an end view of the cam bolt assembly 10 according to the teachings of the present invention. Each cam plate 14 and 16 defines a generally arcuate slot 34. The arcuate slots 34 are used to adjustably couple portions of the vehicle's suspension system. The position of the suspension components (not shown) mounted to the cam plates 14 and 16 can be adjusted by translating the suspension components within the arcuate slot 34.

Each cam plate 14 and 16 additionally defines a generally triangular periphery 32. One side of the triangle periphery 32 has an exterior surface 36 which generally conforms to the arcuate slot 34. Disposed between the exterior surface 36 is a plurality of measurement marks 38 which are used to position suspension components within the arcuate slot 34. Each cam plate 14 and 16 is formed of low carbon steel and has a thickness of about 5 mm.

Figure 4:
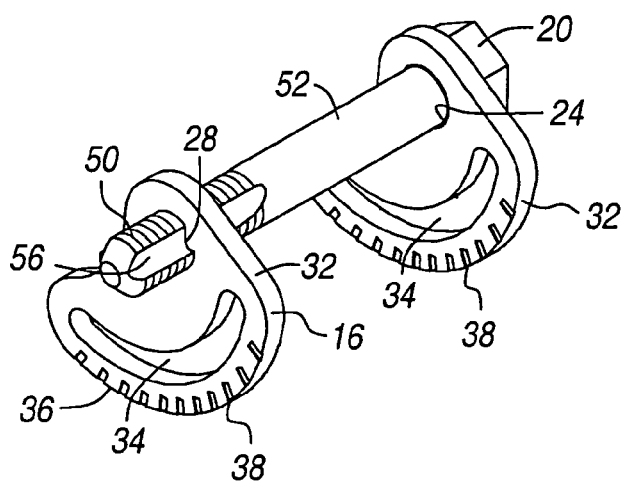
FIG. 4 is a perspective assembled view of the retaining bolt.

FIG. 4 is a perspective assembled view of the cam bolt assembly 10. Shown is the second cam plate 16 disposed over a threaded portion 50 of the threaded bolt 12. Defined on the threaded portion 50 of the threaded bolt 12 is a pair of longitudinal channels 56. The pair of channels 56 can optionally extend into a shoulder portion 52 of the threaded fastener 12. The channels 56 define a generally t-shaped cross section.

Figure 5:
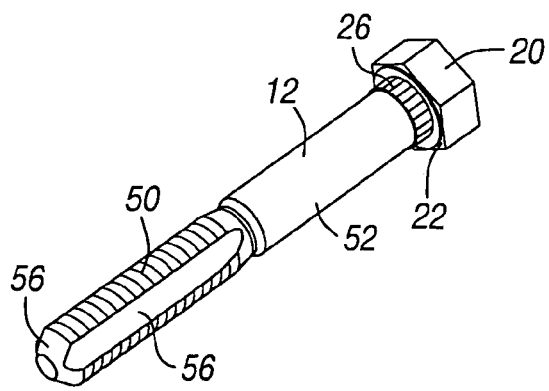
FIG. 5 is a perspective view of the threaded bolt.
Figure 6:
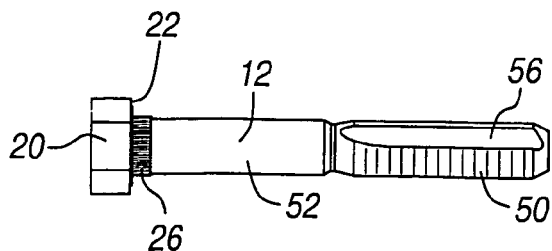
FIG. 6 is a side view of the threaded bolt shown in FIG. 5.

FIGS. 5 and 6 are perspective and side views of the threaded bolt 12. Shown is the knurl portion 26 defined adjacent the head 20 on the unthreaded shoulder portion 52 of the threaded fastener 12. The knurl portion 26 is pressed into the aperture 24 of the first plate 14. While the threaded bolt 12 can be formed of 1018 steel, any suitable material can be used. Optionally, this material can be heat treated. The second cam plate 16 and the channels 56 define an interface capable of withstanding 150 nm of torque, and preferably 200 nm of torque.

Figure 7:
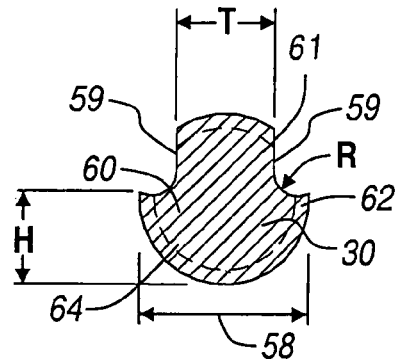
FIG. 7 is a cross sectional view of the threaded bolt shown in FIG. 2.

FIG. 7 is a cross sectional view of the threaded bolt shown in FIG. 5 and 6. The threaded portion 50 has a diameter of between 13.75 and 14 mm. The pair of channels 56 define a first portion 58 having a thickness T of about 8.3 mm. The pair of channels 56 can be cut through a portion of a threaded portion of the threaded bolt. Additionally, it is envisioned the channels can be cut through the entire length of the threaded portion, into a non-threaded portion of the bolt. The channels 56 further define a pair of generally flat exterior bearing surfaces 59 which mate with the corresponding interior surfaces within the aperture 28. The second portion 60 has a height H of about 8.0 mm. Each channel has an inner radius R of about 2.0 mm. Each channel 56 cuts through the threads 62 of the threaded portion into the central core portion 64 of the cross section 30. Preferably, the bolt will have a bolt strength class rating of 8.8 to 10.9 and greater. The previously mentioned specific dimensions disclosed herein have been found to allow the cam bolt assembly 10 to maintain a strength class 10.9 rating, while maintaining the torsional stability needed in suspension components.

The description of the invention is merely exemplary in nature and, thus, variations that do not depart from the gist of the invention are intended to be within the scope of the invention. Specifically, the measurements are provided for a specific diameter bolt. As such, the various measurements can be used are exemplary and can be used as ratios to form cam bolts having larger or small diameter threaded bolt. Such variations are not to be regarded as a departure from the spirit and scope of the invention.

What is claimed is:

1. A cam bolt assembly for using in a vehicle's suspension system to adjust the vehicles wheel alignment comprising:
   a threaded fastener defining a pair of longitudinal channels, each having the same cross section and a head portion, a knurled portion disposed adjacent to the head, each channel defining a generally flat channel bearing surface and a concave curved portion, said planar channel bearing surfaces being parallel;
   a first cam plate non-rotatably coupled to the knurl portion threaded fastener; and
   a second cam plate defining an aperture having a pair of flat aperture bearing surfaces, at least one flat aperture bearing surface being in contact with at least one planar channel bearing surface, said aperture being non-rotatably mated to the pair of longitudinal channels, wherein at least one of the first or second cam plates has an arcuate slot configured to mate with a component of the suspension system, and wherein the rotational position of the first and second cam plates with respect to each other is fixed.

2. The cam bolt assembly according to claim 1 wherein the first and second cam plates comprise an arcuate slot.

3. The cam bolt assembly according to claim 1 wherein the threaded fastener has a t-shaped cross section.

4. The cam bolt assembly according to claim 1 wherein the knurl portion is configured to mate with the first cam plate to prevent relative movement between the threaded fastener and the first cam plate.

5. The cam bolt assembly according to claim 1 wherein the channel defines a pair of bearing surfaces which mate with a corresponding interior bearing surfaces within the aperture.

6. The cam bolt assembly according to claim 1 wherein the second cam plate and the channels define an interface which is configured to withstand at least 150 N-m of torque.

7. The cam bolt assembly according to claim 6 wherein the threaded fastener has a diameter of about 14 mm.

8. The cam bolt assembly according to claim 7 wherein the pair of channels defines a first portion having a thickness of about 8 mm.

9. The cam bolt assembly according to claim 8 wherein the pair of channels defines an inner radius of 2.0 mm.

10. The cam bolt assembly according to claim 9 wherein the pair of channels defines a second portion has a height of about 8 mm.

11. The cam bolt assembly according to claim 10 wherein the pair of channels defines inner radius of about 2.0 mm.

12. The cam bolt assembly according to claim 11 wherein the pair of channels are defined through threads of the threaded fastener into a central core portion the threaded fastener.

13. The cam bolt assembly according to claim 7 wherein the threaded fastener comprises a shoulder portion.

14. The cam bolt assembly according to claim 7 wherein the bolt has a bolt strength class of 10.9.

15. An automotive vehicle suspension component used to adjust the vehicles wheel alignment comprising:
    a fastener having a first threaded portion defining a pair of longitudinal channels along a portion of the threaded portion, and a non-threaded portion defining a knurl, each channel defining a channel bearing surface and a concave curved portion, wherein the longitudinal channels have the same cross-section;
    a first cam plate coupled non-rotatably to the knurl of the non-threaded portion; and
    a second cam plate defining an aperture mated to the pair of longitudinal channels, said aperture defining a pair of flat aperture bearing surfaces, at least one flat aperture bearing surface being in contact with at least one planar channel bearing surface,
    wherein the first and second cam plates each have an arcuate slot configured to mate with a component of the suspension system.

16. The suspension component according to claim 15 wherein the first and second cam plates comprise an arcuate slot.

17. The suspension component according to claim 15 wherein the first threaded portion has a t-shaped cross section.

18. The suspension component according to claim 15 wherein the non-threaded portion has a knurl portion configured to mate with a circular aperture defined by the first cam plate.

19. The suspension component according to claim 15 wherein the channel defines a pair of non-threaded bearing surfaces which mate with corresponding interior bearing surfaces within the aperture.

20. The suspension component according to claim 15 wherein the threaded fastener has a bolt strength class of greater than 10.9.

21. The suspension component according to claim 15 wherein the longitudinal channels are partially defined by the non-threaded portion.

* * * * *